(12) United States Patent
Kobeh et al.

(10) Patent No.: US 7,937,303 B2
(45) Date of Patent: May 3, 2011

(54) GRANTS MANAGEMENT SYSTEM

(75) Inventors: Gerardo Kobeh, Bethesda, MD (US);
Frank Godeby, Bethesda, MD (US);
James Keith Harmon, Alexandria, VA (US); Joseph Thompson, Vienna, VA (US)

(73) Assignee: SAP AG, Walldorf (DE)

( * ) Notice: Subject to any disclaimer, the term of this patent is extended or adjusted under 35 U.S.C. 154(b) by 2847 days.

(21) Appl. No.: 10/673,431

(22) Filed: Sep. 30, 2003

(65) Prior Publication Data

US 2005/0071262 A1    Mar. 31, 2005

(51) Int. Cl.
*G06Q 40/00*    (2006.01)
(52) U.S. Cl. .......................................... 705/35
(58) Field of Classification Search ...................... 705/35
See application file for complete search history.

(56) References Cited

U.S. PATENT DOCUMENTS

| | | | |
|---|---|---|---|
| 7,111,010 B2* | 9/2006 | Chen | 707/102 |
| 2002/0120538 A1* | 8/2002 | Corrie et al. | 705/35 |
| 2003/0004736 A1* | 1/2003 | Calderaro et al. | 705/1 |
| 2003/0177481 A1* | 9/2003 | Amaru et al. | 717/148 |
| 2004/0064332 A1* | 4/2004 | Zou et al. | 705/1 |
| 2005/0192826 A1* | 9/2005 | Kanefsky | 705/1 |

* cited by examiner

*Primary Examiner* — Hani Kazimi
(74) *Attorney, Agent, or Firm* — Kenyon & Kenyon LLP

(57) ABSTRACT

A system and method for managing grants received from one or more sponsors is proposed. The grants management system receives a transaction request and retrieves data associated with the transaction request from a data cube. The grants management system then determines, from the perspective of the sponsors, if the transaction request satisfies administrative and financial requirements imposed by the sponsors. If the administrative and financial requirements are satisfied, the transaction request is admitted.

22 Claims, 4 Drawing Sheets

100

_US 7,937,303 B2_

GRANTS MANAGEMENT SYSTEM

BACKGROUND

Embodiments of the present invention relate to grants management systems and methods, and in particular, grants management systems and methods that handle administrative and financial requirements of one or more sponsors.

Between organizations, a "grant" represents a legal obligation on which a sponsor organization typically commits a predetermined sum of money to a grantee organization. The sponsor defines a series of requirements that dictate, for example: how the money may be used, when the money may be used, whether and how the grantee must perform cost-sharing between other revenue sources and the money committed by the sponsor, when the grantee may invoice the sponsor, how the grantee must report expenditures to be made against the grant, and how the grantee can charge overhead items, or indirect cost, to the sponsor. For public sector organizations, grants may fund a large percentage of the organizations' operations.

A grantee may solicit and win a variety of different grants from a variety of different sponsors. Typically, each grant is independently established and carries its own set of requirements. Thus, it may be administratively difficult for an organization to manage its operations on an ongoing basis and to determine, for a particular transaction (say, an expenditure of funds), whether the transaction satisfies the requirements of one or more grants. Without such oversight and control, however, it is reasonably likely that the grantee will perform a transaction that is not funded.

Enterprise management applications ("EMAs") are commercially available from SAP, the assignee of the present invention, and others. EMAs are computer systems that are used by an organization during the course of its operation to monitor and manage transactions. For example, if an organization were to create a purchase order to buy goods, the EMA may generate financial documents to reflect the purchase on its general ledger accounts. The EMA also may determine whether the purchase order is acceptable under a budget established for the organization. EMAs may include a host of other processes designed to facilitate the operations of an organization.

The inventors identified a need in the art for a grants management system that is capable of managing expenditure transactions of a grantee organization and to ensure that the expenditures are consistent with the requirements of various grants. Currently, no known EMA considers the requirements of grants when determining whether to accept or reject a proposed transaction. Furthermore, no known EMA can show transactional information in each sponsor's terms.

DETAILED DESCRIPTION

A system and method for managing grant(s) received from one or more sponsors is provided in accordance with embodiments of the present invention. According to embodiments of the present invention, a grants management system receives a transaction request and data associated with the transaction request. The grants management system, then, determines, from the perspective of the sponsors, if the transaction request satisfies administrative and financial requirements imposed by the sponsors. If it satisfies such requirements, the grants management system admits the transaction request. The grants management system proposed by the present invention provides a computer-based tool to manage expenditure transactions and revenue of an organization and to ensure that they are consistent with the requirements of the various grants under which it operates.

Figure 1:
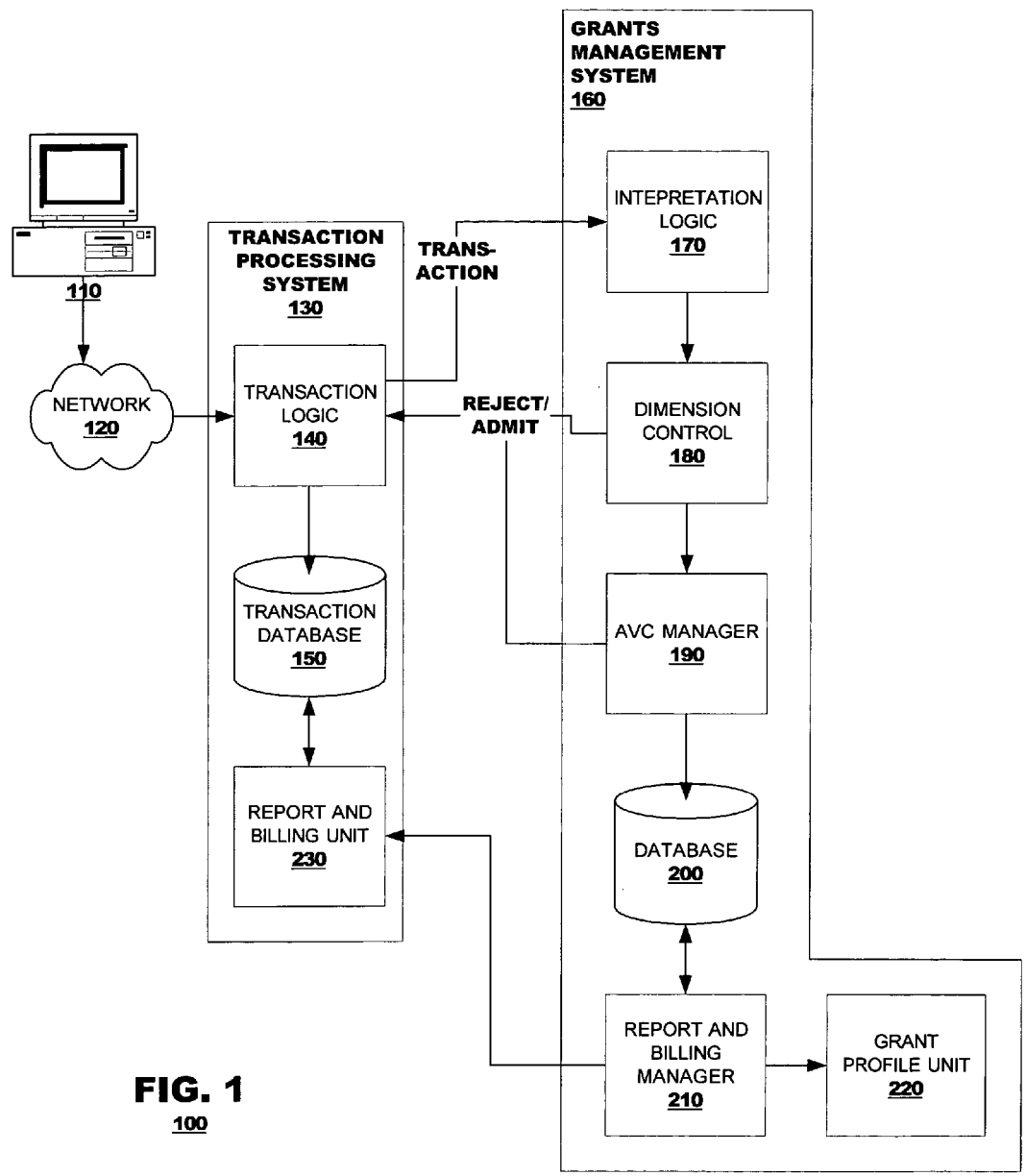
FIG. 1 illustrates a grants management system according to an embodiment of the invention.

FIG. 1 illustrates an EMA system 100 operating in accordance with an embodiment of the invention. The EMA system 100 may include a client terminal 110 interconnected to a transaction processing system 130 by a communication network 120. The architecture of the client, the server and the network are immaterial for the purpose of the present invention. As is apparent to one skilled in the art, any network 120 would suffice. The communication network 120 also may be provided in communication with one or more client terminals.

The transaction processing system 130 may include a transaction logic 140, and a transaction database 150. The transaction logic 140 may receive transaction requests from operators at various terminals (e.g., 110) and process the transaction request according to transaction rules. The transaction database 150 may store data of transactions that have been admitted to the system 130 by the transaction logic 140. For example, the transaction database 150 may store data representing various purchase orders generated by the organization and billing documents generated by the organization. The transaction logic 140 may include a number of other functional components that are typical to EMA systems, including financial management systems, materials management systems, financial accounting, fund management, asset management, human resources, and the like. Of course, the type of data stored by the transaction database 150 will be determined by the number and type of components provided by the transaction logic 140. In this regard, the operation of the transaction processing system 130 is well-known.

Embodiments of the present invention provide a grants management system 160 for use with a transaction processing system 130. The grants management system 160 may determine whether a proposed transaction, entered at a terminal 110, may be admitted to the transaction processing system 130. Thus, as shown in FIG. 1, the GM system 160 may receive data representing a transaction from the transaction processing system 130 and may determine whether to reject a proposed transaction according to predetermined rules established for the grants.

Representative examples may be useful to facilitate an explanation of the invention. Consider a hypothetical university that has secured grants from two different sponsors (sponsors A and B), and runs the grants in US dollars. Sponsor A grants to the university €1.5M, in Euros, to support research in quantum mechanics under the following terms:

The grant lasts for three years, after which it expires and any unused sums are forfeit;

The university may spend at most €0.5M in each of the three years;

The university may bill the sponsor quarterly;

All temporal requirements are based on the sponsor's fiscal year, which expires September 30 of each calendar year, which differs from the university's fiscal year;

The university must spend the money in the following proportions: 70% for supplies (lab equipment) and 30% for travel; and Travel expenses must be cost-shared on a one-for-one bases with the university's own money.

Sponsor B, by contrast, grants to the university $2M under the following terms:

Sponsor B will pay the $2M over two years, in semester installments;

The money does not expire;

The university must spend the money in the following proportions: 50% to support research in computer science field, and 50% for research in quantum mechanics fields, which can be used for travel, supplies, and marketing purposes;

The university must report expenditures against the grant annually according to Sponsor B's fiscal year, which expires March 30 of each calendar year.

In practice, the requirements of modern grants are much more complicated than those shown above. Nevertheless, the foregoing example is instructive because it demonstrates that each grant defines a rule structure that is independent of the rule structures of other grants. Grants define financial expectations in a variety of currencies, using triggering conditions that can vary widely. From the grantee's perspective, the aggregation of grants defines a pool of resources from which it may fund its programs. For example, if the university were to purchase equipment for a physics laboratory, it might be possible to charge the expense against either grant because the equipment might be considered "lab equipment" under Sponsor A's grant and it also supports research in quantum mechanics as required by Sponsor B's grant. Again, the GM system 160 can manage admission of transaction data that is relevant to a grant, compare the transaction against rule sets defined by the grants and determine whether to reject the transaction because, for example, it is inconsistent with the requirements of the grants.

The GM system 160 may include an interpretation logic unit 170, a dimension control unit 180, an availability control (AVC) manager 190, and a database 200. The interpretation logic 170 may convert transaction data from a domain of the transaction processing system 130 to a domain of a grant. In the foregoing examples, while the university's transaction processing system 130 may use U.S. dollars for currency values, to determine whether a transaction can be admitted under Sponsor A's grant, the interpretation logic 170 may convert financial values to Euros.

Responsive to the converted transaction data, the dimension control unit 180 may determine whether the transaction relates to a valid expenditure under the grant. If the dimension control unit 180 determines that the requested data maps to an invalid data entry, the requested transaction may be rejected. For example, in the foregoing examples, grants from Sponsor A and B both permit travel expenditures to be posted against the grant but marketing expenditures can be made only against Sponsor B's grant but not Sponsor A's grant. If it were attempted to post marketing expenditures against Sponsor A's grant, there would be no category defined for such expenditures. A notice of rejection may be communicated to the transaction logic, which would prevent the proposed transaction from being accepted. Otherwise, if the converted transaction maps to a valid dimension, the dimension control unit 180 may forward the requested transaction and data to the AVC manager 190.

The AVC manager 190 may receive the transaction request from the dimension control 180. Responsive to the converted transaction data, the AVC manager 190 may determine whether the requested transaction is consistent with consumed budget under the grant. Using the foregoing example, if the university has already spent $90K in computer science under Sponsor B's grant and the transaction proposes to spend another $50K, the transaction would exceed the $1M limit established for computer science expenditures (50% of $2M). The AVC manager 190 may cause a transaction to be rejected, even if the transaction maps to a valid category under the grant, if the transaction would cause a limit defined for the grant to be exceeded. If the requested transaction is inconsistent with the budgetary plan, the requested transaction may be fed back to the transaction logic 140, and a proper error notice may be given to the user. If the requested transaction is consistent, the requested transaction may be admitted to the EMA. The converted transaction data may be stored in the GM database 200. The transaction data also may be stored in the transaction database 150 according to processes established in the transaction system 130.

Figure 2B:
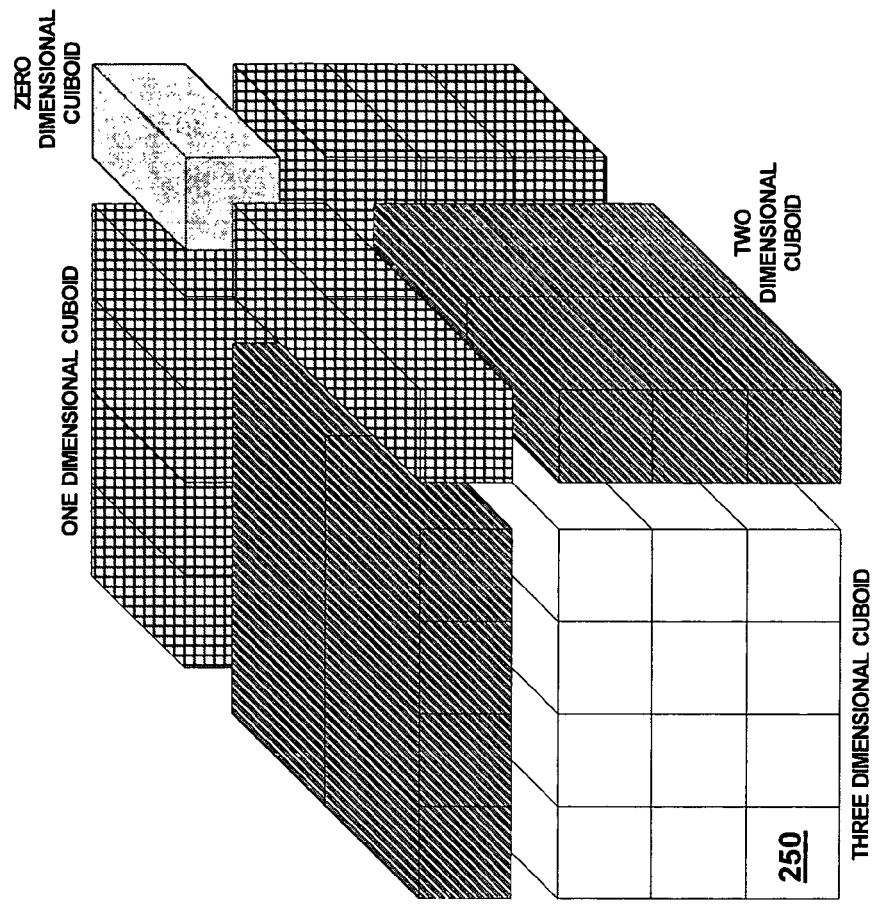
FIG. 2B illustrates exemplary data cuboids according to an embodiment of the present invention.
Figure 2A:
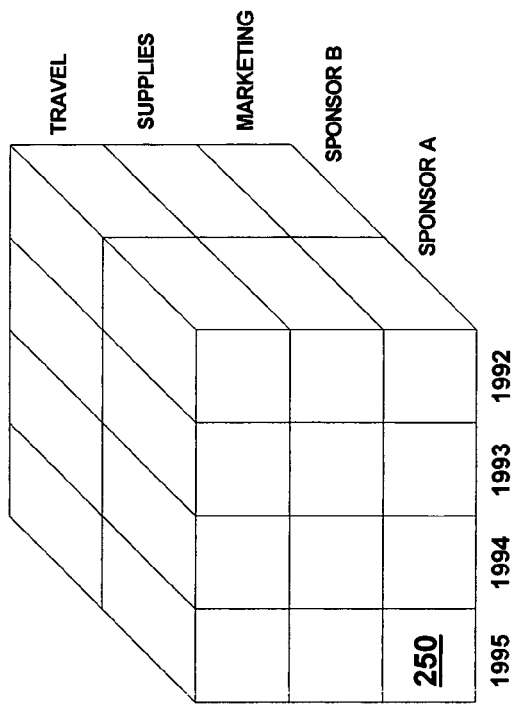
FIG. 2A illustrates an exemplary data cube according to an embodiment of the present invention.

In one embodiment, the GM database 200 may employ a data cube architecture to store aggregation information, shown in exemplary fashion in FIGS. 2A and 2B. FIG. 2A illustrates a multi-dimensional data cube tailored to a relational database containing transactions for a grant project entitled "Quantum Mechanics," which is sponsored by two sponsors, namely, Sponsor A and Sponsor B. Only three dimensions are shown in this example; in practice, the data cube may include many more dimensions. The data cube includes, as illustrated in FIG. 2B, a three dimensional core cuboid, three two dimensional cuboids, three one dimensional cuboids, and a zero dimensional cuboid. In the three-dimensional cuboid, the data associated with the "Quantum Mechanic" project is categorized by sponsors, fiscal year, and types of expenses. Each entry ("tuple") within the core cuboid contains an aggregated value for all admitted transactions that fit the classification of that tuple. Meaning, tuple 250 stores data representing how much money has been spent in 2003 on marketing and applied to the grant of Sponsor B. Other tuples store aggregated data in other categories. For any grant that does not permit expenditures in a particular class (for example, there is no marketing provision for the grant of Sponsor A), the corresponding tuple in the data cube will be empty or invalid.

Lower dimensional cuboid aggregates reflect information from the database grouped by a fewer number of attributes than the tuples of the core cuboid. For example, a two dimensional data space, as shown in FIG. 2B, may be created to monitor transactions by types of expense and sponsors, but across multiple years. Data cubes represent a well-known data structure for analyzing large relational database. As will be apparent to one skilled in the art, the dimension of a data cube may easily be expanded or reduced.

In addition to the data cube, the GM database 200 may store other data relating to admitted transactions, including related e-mails, facsimiles, letters, portable document format (pdf) files, or any other data. If such data is duplicative of data stored in the transaction database 150, the GM database 200 may store pointers to such items, addressing the items' location in transaction database.

Figure 3:
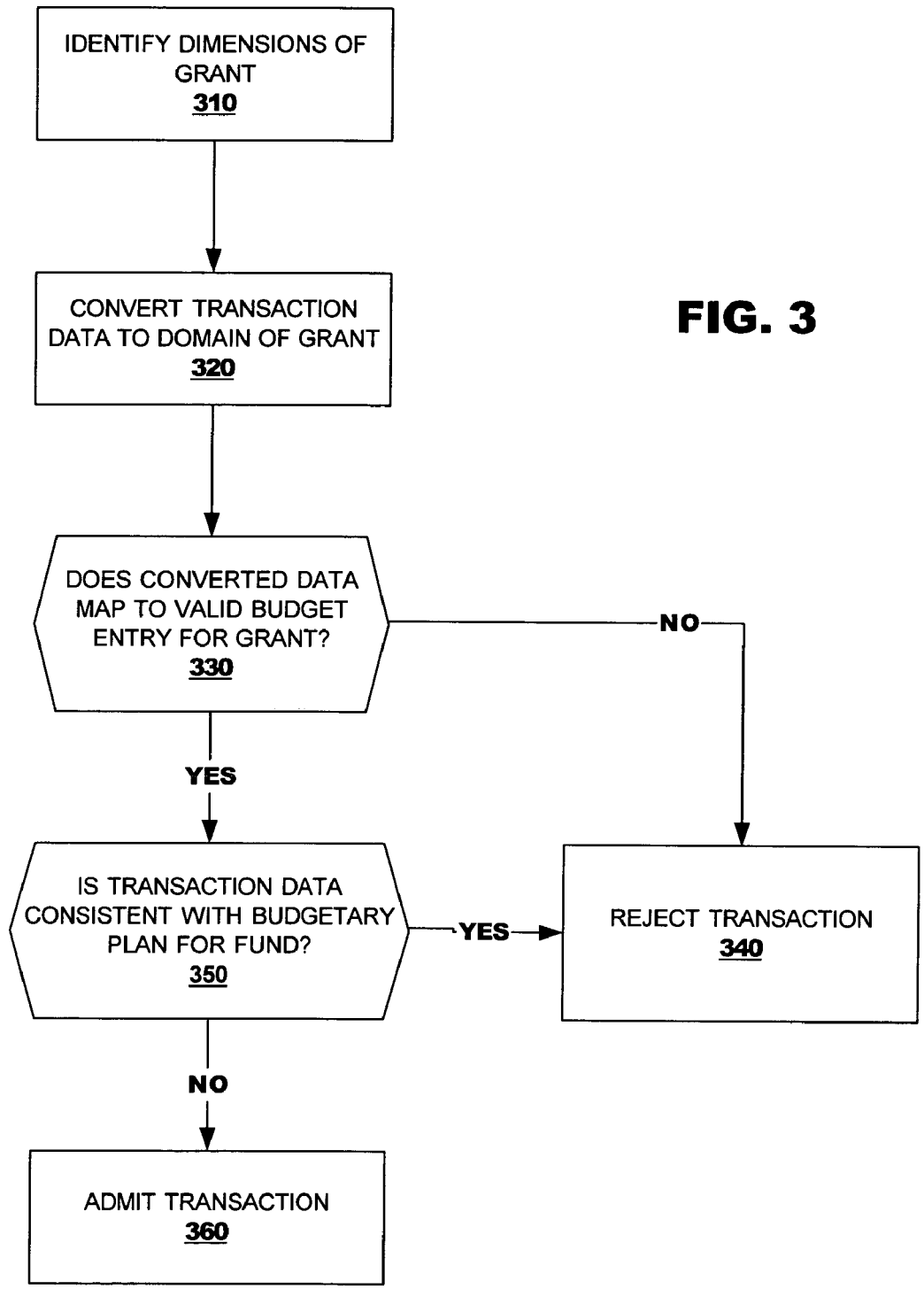
FIG. 3 illustrates a grants management method according to an embodiment of the present invention.

FIG. 3 illustrates a grants management method 300 according to an embodiment of the present invention. When data for a transaction becomes available, the system may identify which grant the transaction is being posted against (box 310). From this determination, the transaction data may be converted to domain of the grant (box 320). For example, if the university operates in dollars, and Sponsor A's grant is in Euros, the transaction data is converted from dollars to Euros. Other types of data, such as fiscal year variant, cost-sharing details, and any other information for which the sponsor and grantee may have different preferences, may also be converted.

The grants management system (GM system) may determine whether the converted data maps to a valid budget entry for a particular grant (box 330). Whether the converted data maps to a valid budget entry may be determined by, but not limited to, calculating the data cube using any technique known to one skilled in the art. Referring back to the foregoing examples, the dimension of the grant project "Quantum Mechanics" may be identified to be three: namely, travel, supplies, and marketing. Sponsor A, however, may require the grantee to use Sponsor A's grant for travel and supplies purposes only, while Sponsor B allows the grantee to use his Sponsor B's grant for travel, supplies, and marketing purposes. In such a case, the transaction request, which requires retrieval of marketing expenses from Sponsor A's grant, would map to an invalid budget entry for grant. Accordingly, the requested transaction may be rejected and a proper error message may be sent to the user (box 340).

If the converted data maps to a valid budget entry for grant, the GM system determines whether the requested transaction is consistent with a budgetary plan (box 350). In doing so, the GM system may consider whether the requested transaction would cause the budget to be exceeded for the grant. For example, Sponsor A may want only thirty percent of Sponsor A's grant to be used for travel purposes and seventy percent for supply purposes. The requested transaction would cause budget to be exceeded for Sponsor A's travel allotment if the transaction requires the total travel expense to exceed thirty percent of Sponsor A's authorized grant budget. In the event that the transaction data is inconsistent with the budgetary plan, the requested transaction may be rejected and a proper error message may be sent to the user at the client terminal (box 340). If the transaction data is consistent with the budgetary plan, the requested transaction may be admitted and data associated with the transaction may be stored in a database in the user's preferred terms (box 360).

As illustrated in FIG. 2B, an N dimensional data cube may include includes tuples (such as 250) broken down according to every dimension and further may include tuples representing aggregations in lower dimensions. So, in the three dimensional representation of FIG. 2B, two dimensional tuples, one dimensional tuples and even "zero dimensional" tuples are illustrated. Where the three dimensional space may illustrate spending broken down by year, by sponsor and by class, two dimensional tuples may represent spending by sponsor and by class but across all years. Other two dimensional tuples in this example may represent spending: 1) by year and by class but across all sponsors or 2) by year and by sponsor but across all classes. One dimensional tuples may include all spending: 1) by sponsor (across all years and all classes), 2) by class (across all sponsors and years), or 3) by year (across all sponsors and classes). A "zero" dimensional tuple may store all spending across all dimensions.

As noted above, sponsors are free to define requirements in whatever terms they desire.

Thus, values in common tuples may not be common units. In the Sponsor A/Sponsor B example provided above, the currencies are different. Thus, in performing aggregation across dimensions there may also be conversion among values to arrive at comparable values.

According to another embodiment of the present invention, the grants management system may accommodate such lower dimensional aggregations in determining whether a proposed transaction may be accepted or rejected.

Figure 4:
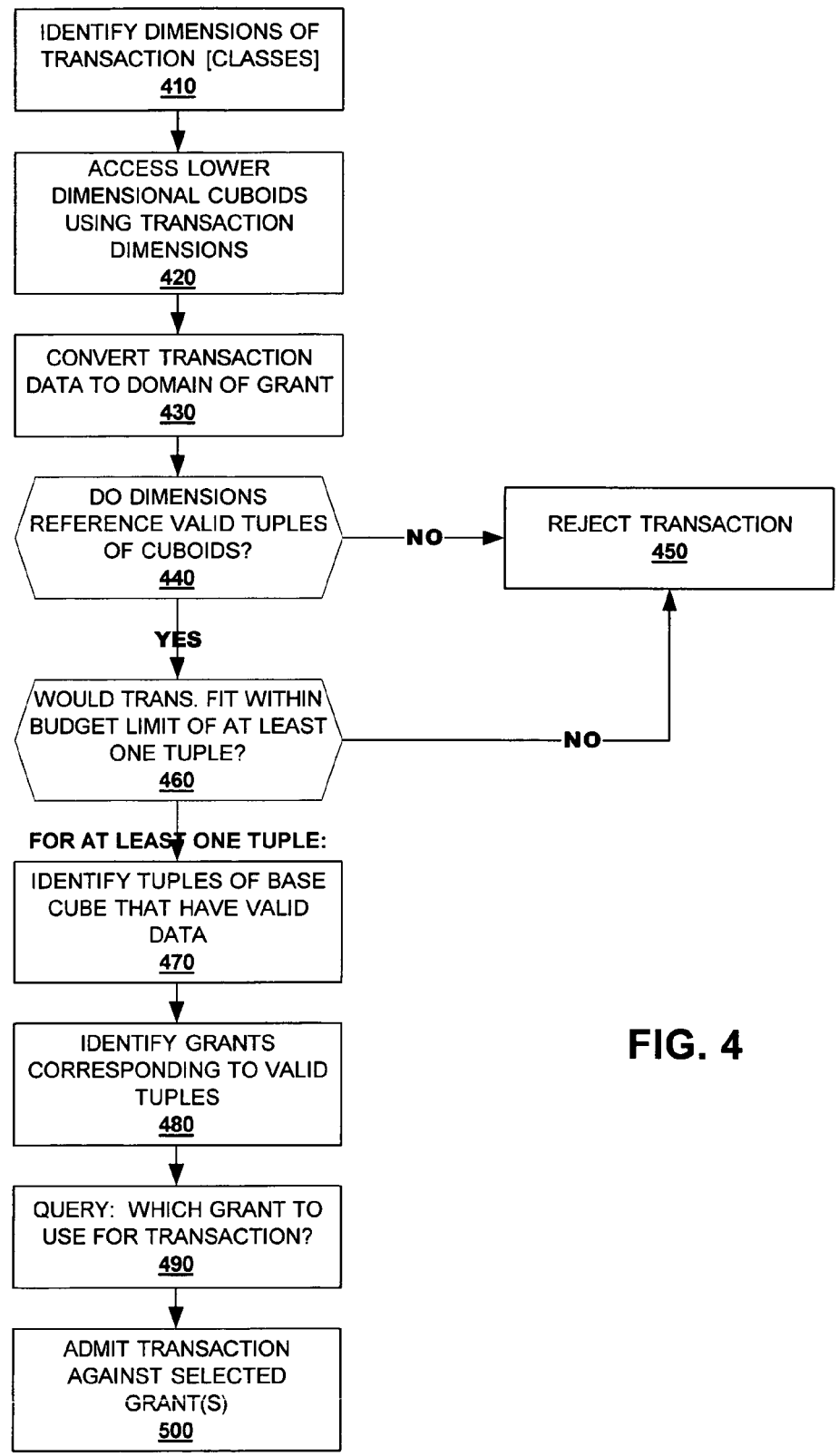
FIG. 4 illustrates a grants management method according to another embodiment of the present invention.

FIG. 4 illustrates a grants management method 400 according to another embodiment of the present invention. In this embodiment, the transaction data need not identify the grant against which the transaction is to be posted, but it does provides sufficient information to identify, for example, the classes (travel vs. supplies, computer science vs. quantum mechanics) to which the transaction relates (box 410). Responsive to the transaction request, the GM system may identify the lower dimensional tuples to which the transaction relates (box 420). Once the dimension(s) are identified, the transaction data may be converted to domain of these tuples (box 430). Of course, if no valid lower dimensional tuple has been identified for the transaction data (box 440), the system may reject the transaction (box 450).

If the converted data maps on a valid budget entry for grant (box 440), the GM system determines whether the requested transaction is consistent with the budgetary plan (box 460).

If so, the system may admit the transaction. The system also may scan through the base data cube to identify higher dimensional tuples that are valid for the transaction (box 470). Having identified the tuples, the GM system may identify grants that correspond to valid tuples (box 480). The GM system may then query the operator to identify the grant(s) against which the transaction should be posted (box 490). Responsive to the indication, the system may validate the transaction against the selected grant(s) (box 500) and admit the transaction.

Referring back to FIG. 1, the GM system also may provide for a flexible billing/reporting tool to satisfy various sponsor requirements. The grantee's reimbursements may be obtained in many different ways: cost reimbursement by submitting invoices or letter of credit accounts, scheduled payments (i.e., monthly payments and milestone payments), and advance payments. Each sponsor also may impose special reporting and billing requirements on the grantee organization. For example, Sponsor A may require, in addition to the terms listed above, the grantee to submit invoices on a cash basis and an annual status report according to Sponsor A's fiscal year, which starts September 30 of each calendar year. To satisfy such requirements, the GM system may also include a reporting and billing manager 210, which communicates with a grant profile unit 220, and a reporting and billing unit 230 of the transaction processing system 130. The grant profile unit 220 may store data representative of the grants, including such data as the sponsor's fiscal year, currency, dimension, billing requirements, and the like. Reporting and billing units 230 of transaction processing systems 130 are known; they typically generate electronic or paper records (i.e., bills and reports) in response to source data provided by others units of the transaction processing system 130 (not shown). In this embodiment, the reporting and billing manager 210 may provide source data to the reporting and billing unit 230.

Periodically, the reporting and billing manager 210 may look up the grant profile unit 220 when a report or bill is required to be posted for each grant. If either a report or a bill is due, the reporting and billing manager 210 searches for transaction data from the database 200, which stores the data in the sponsor's terms, using search criterion (i.e., sponsor's fiscal year) obtained from the grant profile. The reporting and billing manager 210 transmits any transaction data that satisfies the search criterion to the reporting and billing unit 230 of the transaction processing system 130, which generates a report and/or bill according to its own processes.

Advantageously, because DB 200 stores transaction data in each sponsor's dimensions (e.g., Euros for the grant of Sponsor A but dollars for the grant of Sponsor B), very little data manipulation is required to generate reports and/or bills. Reporting to sponsors, thus, is simplified tremendously over what otherwise would be a very tedious manual process.

In practice, some grants may specify that reporting and/or billing is to be performed only after certain milestones are achieved pursuant to a grant. Rather than promise a sum of money over a period of years, the grant may promise a first payment of money upon completion of a first objective, a second payment of money upon completion of a second objective and so on. To accommodate such billing provisions, grant profiles may include blocking indicators. When new transactions are posted to the GM system, the system may check to determine if the transaction permits the blocking indicator to be cleared. Alternatively, blocking indicators may be cleared manually by an operator. When a blocking indicator is cleared, the Reporting and billing Manager 210 may generate a new bill using all transaction database 200 entered since a prior blocking indicator was cleared (or since establishment of the grant if the now cleared blocking indicator is the first).

Throughout the foregoing description, reference has been made to one of the computer terminals 110 as a "client terminal," which communicates with a server that is interconnected to the communication network 120. This use of language has been made based on an expectation that doing so makes it easier to explain the principles of the present invention to a lay audience. The principles of the present invention find application in such embodiments, of course, but it is not so limited. For example, the principles of the present invention find application in embodiments that include more than one client terminals and a server or network of servers interconnected by a communications network. The principles also find application in any transaction based system, no matter what architecture is used.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer-implemented grants management method for managing a plurality of grants for a recipient received from a plurality of grant sponsors, comprising:
   responsive to a transaction request and data associated therewith, converting values of the associated data from a domain of a transaction system to a domain defined for one of the plurality of grants,
   determining if the converted data maps to a classification that has been defined under the one of the plurality of grants to be valid,
   if so, determining, based on a set of rules derived from administrative and financial requirements of the plurality of grants and encoded in a database, if the converted data causes a limit defined under the one of the plurality of grants to be exceeded, and
   if not, admitting the requested transaction,
   otherwise, rejecting the requested transaction.

2. The method of claim 1, wherein the domain of the transaction system and the domain of one of the plurality of grants are different.

3. The method of claim 1, wherein the domain of the transaction system is the same as the domain of the one of the plurality of grants.

4. The method of claim 1, further comprising storing the transaction data in a database in the domain defined for the one of the plurality of grants.

5. The method of claim 1, further comprising:
   determining if a report and/or a bill are due according to a predetermined set of reporting and billing rules;
   retrieving transactional data stored in the domain defined for the one of the plurality of grants; and
   if the report and/or the bill are determined to be due, generating the report and/or the bill in the domain defined for the one of the plurality of grants.

6. An enterprise management system for managing a plurality of grants for a recipient received from a plurality of grant sponsors, comprising:
   a transaction management system, operating under a predetermined set of transaction rules and responsive to a transaction request by validating and accepting the transaction,
   a grants management system provided in communication with the transaction system and comprising:
   an interpretation logic unit to convert values of the transaction request from a domain of the transaction system to a domain defined for grant identified from the plurality of grants,
   a dimensional control unit to determine if the converted data maps to a classification that has been defined under the grant to be valid,
   an availability control unit to determine, based on a set of rules derived from administrative and financial requirements of the plurality of grants and encoded in a database, if the converted data would cause a limit defined under the grant to be exceeded, and
   a database storing converted transaction of the transaction requests that map to valid classifications that do not exceed the defined limits.

7. The system of claim 6, wherein the database stores the converted transaction in the domain defined for the identified grant.

8. The system of claim 6, further comprising:
   a reporting and billing manager to generate a report and/or a bill when the report is due according to a predetermined set of reporting and billing rules.

9. The system of claim 8, wherein the reports and bills are generated in the domain defined for the identified grant.

10. An enterprise management system for managing a plurality of grants for a recipient received from a plurality of grant sponsors, comprising:
    a transaction management system, operating under a predetermined set of transaction rules and responsive to a transaction request by validating and accepting the transaction,
    a grants management system provided in communication with the transaction system and responsive to the transaction request by:
    converting values of the transaction request from a domain of the transaction system to a domain defined for grant identified from the plurality of grants,
    determining if the converted data maps to a classification that has been defined under the grant to be valid,
    if so, determining, based on a set of rules derived from administrative and financial requirements of the plurality of grants and encoded in a database, if the converted data causes a limit defined under the grant to be exceeded, and
    causing the transaction management system to reject to requested transaction if the limit is exceeded.

11. The enterprise management system of claim 7, further comprising first and second databases, one provided for the transaction system and the other provided for the grants management system, each storing transaction data of transactions admitted by the grants management system, the transaction system's database storing the original transaction data and the grants management database storing the converted transaction data.

12. The enterprise management system of claim 10, wherein the grants management system comprises a database storing a data cube of aggregated transaction data, the data cube having dimensions for all parameters defined for all grants managed by the grants management system.

13. A computer-implemented method for managing a plurality of grants for a recipient received from a plurality of grant sponsors, comprising:
  receiving a transaction request and data associated with the transaction request from a transaction management system of a grant recipient;
  determining, based on a set of rules derived from administrative and financial requirements of the plurality of grants and encoded in a database, if the transaction request satisfies the rules imposed by the sponsor,
  if so, admitting the transaction request;
  otherwise, rejecting the transaction request; and
  converting the associated data to a predetermined domain of a grant identified from the plurality of grants.

14. The method of claim 13, further comprising determining if the associated data maps to a valid budget entry for the grant.

15. The method of claim 14, further comprising rejecting the transaction request if the associated data maps to an invalid budget entry for the grant.

16. The method of claim 13, further comprising determining if the associated data is consistent with a budgetary plan.

17. The method of claim 16, further comprising rejecting the transaction request if the associated data is inconsistent with the budgetary plan.

18. The method of claim 13, wherein the administrative and financial requirements from one sponsor is different from the administrative and financial requirements from another sponsor.

19. An enterprise management system for managing a plurality of grants for a grantee received from a plurality of grant sponsors, comprising:
  a transaction management system, operating under a predetermined set of transaction rules imposed by a sponsor on the grantee and responsive to a transaction request by validating and accepting the transaction, and
  a grants management system of the grantee provided in communication with the transaction system, to determine if the transaction request satisfies the predetermined set of transaction rules imposed by the sponsor, and if so, storing transaction data,
  wherein the grants management system comprises:
    a reporting and billing manager to generate a report and/or a bill to the sponsor pursuant to a predetermined set of reporting and billing rules and the transaction data, and
  wherein the grants management system further comprises:
    an interpretation logic unit to convert values of the transaction request from a domain of the transaction system to a domain defined for an identified grant,
    a dimensional control unit to determine if the converted data maps to a classification that has been defined under the grant to be valid,
    an availability control unit to determine if the converted data would cause a limit defined under the grant to be exceeded, and
    a database storing converted transaction of transaction requests that map to valid classifications that do not exceed the defined limits.

20. The system of claim 19, wherein, pursuant to a predetermined set of rules imposed by the sponsor, the reporting and billing manager retrieves the transactional data stored in the sponsor's terms, and generates a report and/or bill in the sponsor's terms when it is determined to be due.

21. The system of claim 19, wherein the sponsor and grantee run the grant on different terms.

22. An enterprise management system for managing grants for a grantee received from grant sponsors, comprising:
  a transaction management system operating under a predetermined set of transaction rules and responsive to a transaction request by validating and accepting the transaction,
  a grants management system provided in communication with a transaction system wherein the transaction system comprises:
    an interpretation logic unit to convert values, of the transaction request from a domain of the transaction system to a domain defined for an identified grant,
    a dimensional control unit to determine if the converted data maps to a classification that has been defined under the grant to be valid,
    an availability control unit to determine, based on the predetermined set of transaction rules, if the converted data would cause a limit defined under the grant to be exceeded,
    a database storing converted transaction of transaction requests that map to valid classifications that do not exceed the defined limits, and
    a reporting and billing manager to submit a report and/or a bill according to a predetermined set of rules.

* * * * *